United States Patent [19]

Griffiths

[11] Patent Number: 4,620,627
[45] Date of Patent: Nov. 4, 1986

[54] APPARATUS FOR COLLECTING MATERIAL WHICH BECOMES DISLODGED FROM THE UNDERSIDE OF A CONTINUOUS BELT CONVEYOR

[75] Inventor: Arthur Griffiths, Warrington, England

[73] Assignee: Pilkington Brothers P.L.C., Merseyside, England

[21] Appl. No.: 562,747

[22] Filed: Dec. 19, 1983

[30] Foreign Application Priority Data

Dec. 22, 1982 [GB] United Kingdom ................. 8236410

[51] Int. Cl.[4] .............................................. B65G 37/00
[52] U.S. Cl. .................................. 198/580; 198/550.3; 198/494; 198/560
[58] Field of Search ............... 198/580, 720, 607, 561, 198/494, 560, 562, 563, 550.3, 550.4

[56] References Cited

U.S. PATENT DOCUMENTS

| 1,863,562 | 6/1932 | Cannon | 198/580 X |
| 2,391,178 | 12/1945 | McKnight | 198/494 |
| 2,724,493 | 11/1955 | Jones | 198/494 |
| 3,603,449 | 9/1971 | Snow, III | 198/580 X |
| 3,802,554 | 4/1974 | Paulsen et al. | 198/494 |
| 4,094,400 | 6/1978 | Braun et al. | 198/580 X |
| 4,174,030 | 11/1979 | Philibert | 198/494 |
| 4,280,616 | 7/1981 | Wadensten | 198/494 |

FOREIGN PATENT DOCUMENTS

| 1092836 | 11/1960 | Fed. Rep. of Germany | 198/580 |
| 0065367 | 1/1969 | German Democratic Rep. | |
| 0346105 | 6/1960 | Switzerland | 198/580 |
| 0428056 | 4/1935 | United Kingdom | 198/580 |

Primary Examiner—Joseph E. Valenza
Assistant Examiner—Lyle Kim
Attorney, Agent, or Firm—Burns, Doane, Swecker & Mathis

[57] ABSTRACT

The method and apparatus of the invention are for collecting particulate material which falls off the underside of the lower return run of a belt conveyor, and returning that material to the carrying run of the conveyor. An elevator is mounted around the conveyor at the position of a support roller for the lower run, where there is vibration and material is dislodged. The dislodged material is conveyed to a chute over the upper rim of the conveyor without any scraping contact with the underside of the lower run.

5 Claims, 7 Drawing Figures

APPARATUS FOR COLLECTING MATERIAL WHICH BECOMES DISLODGED FROM THE UNDERSIDE OF A CONTINUOUS BELT CONVEYOR

The present invention relates to a method of and apparatus for handling material, and more particularly to a method and apparatus for collecting material which drops off the return run of a continuous conveyor belt and returning that material to the carrying run of the conveyor belt.

Raw materials for use in industrial processes are commonly conveyed along the carrying runs, commonly the upper runs, of continuous conveyor belts. If the material being conveyed is a particulate material a portion of that material may adhere to the belt and be conveyed along the return run of the belt which is usually the lower run. Some of the adhered material may then become dislodged from the return run by a combination of the effect of gravity, if it is a lower run, and vibration of the return run as it is guided and conveyed under or over under rollers, as well as the dislodging effect of those rollers.

Types of material which tend to adhere to the carrying run of a continuous conveyor belt include batch materials used in a variety of industrial processes, such as the raw materials used in the glass and chemical industries, and materials produced by mineral extraction industries (e.g. in mining and quarrying). Also particulate materials which are manufactured during an industrial process for example sugar or salt, or materials rejected for recycling, such as glass in the form of cullet. All these materials tend to adhere to a conveyor belt.

The dislodged material which can accumulate below the return run of a conveyor can be considerable and needs to be continually removed. Furthermore the material that drops from the conveyor creates dust in the operating environment. As the lengths of conveyor belts can vary considerably, for example from 2 meters to many kilometers in length, it may be impractical to dispose a hopper below the whole length of the belt to collect the falling material. In practice therefore the accumulated material is often removed manually by workmen shovelling the material away. This method is not only time consuming and labour intensive but can lead to accidents and is also disadvantageous in creating further dust in the operation environment.

United Kingdom Patent Specification No. 1,405,750 describes a belt cleaner device employing scraper blades mounted for movement along a stationary continuous trough beneath a section of a continuous belt conveyor. The blades scrape material from the underside of the return run of the belt conveyor and scrape against the surface of the trough conveying the material to a position where the material is discharged onto the upper carrying run of the belt conveyor.

Such a belt cleaner suffers from the disadvantages that there is considerable wear on the underside of the belt, on the blades themselves and on the trough walls. Furthermore, much energy is used in operating such a device because of the frictional forces.

It is a main object of the present invention to overcome these disadvantages.

BRIEF SUMMARY OF THE INVENTION

The present invention provides a method of handling material conveyed along the upper carrying run of a continuous belt conveyor and including collecting at a collection location material which adheres to the belt along its carrying run and is dislodged from the underside of the return run of the belt. The collected material is conveyed to a position where the collected material is discharged back onto the carrying run of the belt conveyor, by a movable member disposed around and adjacent to a support roller over which passes the underside of the return belt run and which movable member is not in contact with the underside of the return belt run.

The movable member is preferably an elevator surrounding a section of the belt conveyor at the position of the first support roller for the return belt run. The elevator has a channel section into which material from the return run of the belt conveyor is caught and subsequently transported to a higher position from which the material is discharged back onto the upper carrying run of the conveyor belt. The elevator may be circular or non-circular. In a preferred embodiment the elevator is a circular wheel which is driven either directly from a motor driven support drum or indirectly from the conveyor belt.

Any other suitable forms of elevator may be used. For example one could employ a screw conveyor either motor driven or indirectly driven from the conveyor belt, or a conveyor which has lifting components that are driven electro-magnetically within a hollow tube.

BRIEF DESCRIPTION OF THE DRAWINGS

Some embodiments of the invention will now be described, by way of example, with reference to the accompanying drawings in which.

DETAILED DESCRIPTION

Figure 1:
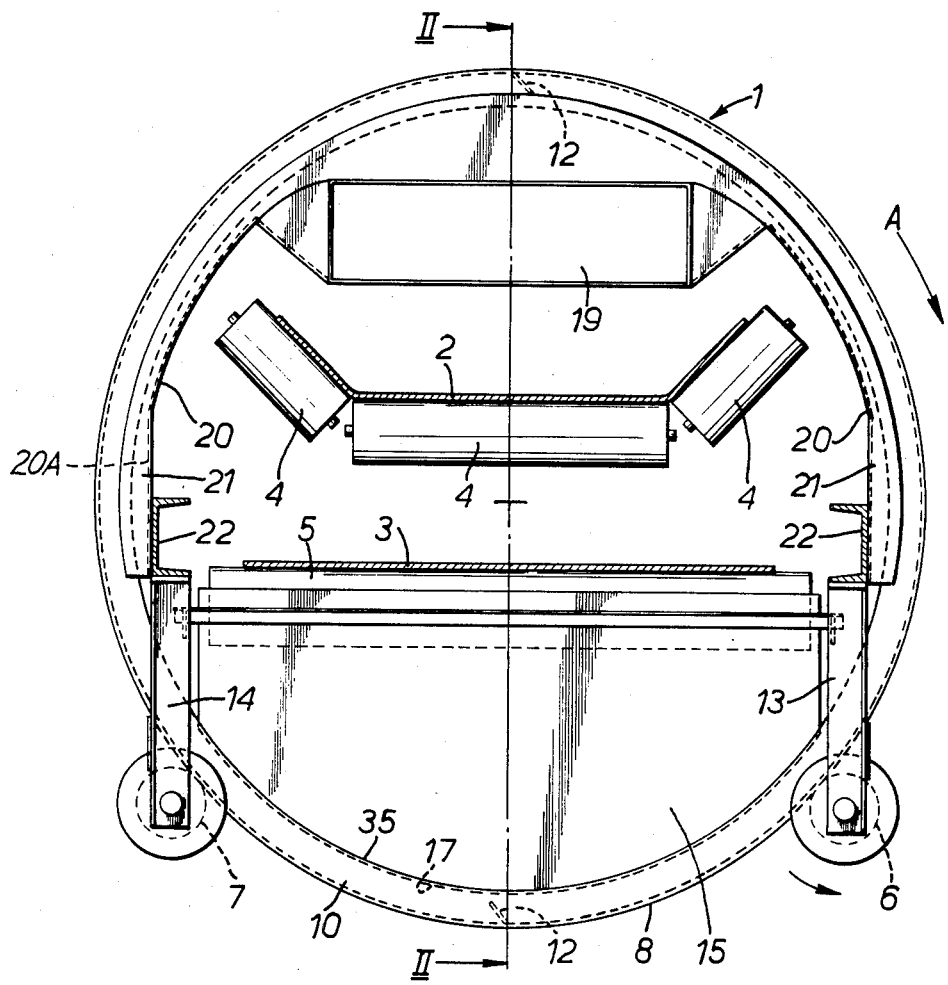
FIG. 1 is a front elevation of a material handling apparatus according to the invention arranged around a conveyor.
Figure 2:
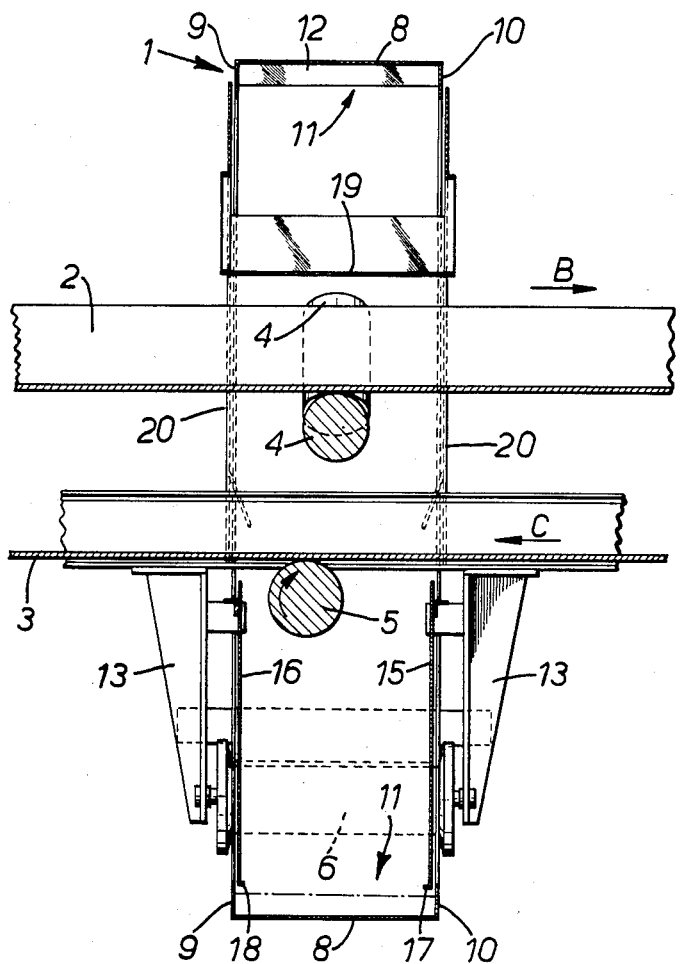
FIG. 2 is a cross-section on line II—II of FIG. 1.

FIGS. 1 and 2 illustrate a first embodiment of materials handling apparatus of the invention mounted around a belt conveyor. The apparatus includes an elevator wheel 1 made of metal, plastics material or glass reinforced cement mounted around a transverse section of a continuous belt conveyor having an upper carrying belt run 2 and a lower return belt run 3. The upper carrying belt run 2 is carried and transported by sets of rollers 4 which shape the belt run 2 into a channel-shaped cross-section for retaining material during its transportation. The lower return run 3 passes over support rollers 5.

The elevator wheel 1 is mounted around the conveyor where the first support roller 5 of the return run is situated and is supported by a driven drum 6 and an idler drum 7. The driven drum 6 drives the wheel in a clockwise direction around the conveyor 4, as indicated by arrow A, by the engagement of the driven drum 6 with the outer cylindrical wall 8 of the elevator wheel 2. The drums 6 and 7 together support the weight of the elevator wheel 2.

The rim of the wheel 1 is of U-section formation with two side walls 9 and 10 which extend radially inwardly from the edges of the peripheral wall 8, so that the rim of the wheel is in the form of a continuous U-shaped channel 11 for receiving material falling from the conveyor. At locations spaced around the channel 11 lifting walls 12 extend transversely across the channel 11 to define a number of troughs in the channel 11 for collecting material which has become dislodged from the lower return run 3 of the conveyor belt in the vicinity of the first support roller 5.

The driven drum 6 is carried by a pair of brackets 13, and the idler drum 7 is carried by a pair of brackets 14. Metal dust guards 15 and 16 are fixed across the wheel between the brackets 13 and 14. As shown in FIG. 2, the dust guard 15 has an arcuate lower edge 17 which extends downwardly just into the channel 11 and is in-turned to avoid undue contact with the inner edge of adjacent side wall 10. The dust guard 16 is similarly shaped with an arcuate, in-turned lower edge 18.

A chute 19 is mounted above the upper run 2 of the conveyor to receive material which has been conveyed upwardly by the troughs in the wheel and tipped into the chute 19 which discharges onto the upper belt run 2. Formed integrally with the chute 19 are depending side channels 20 which have a U-shaped cross-section and the side walls 21 of which overlap the side walls 9 and 10 of the rim of the wheel 1. Any material which falls out of a trough in the wheel rim before that trough is over the chute 19 falls down one of the side channels 20 along a gap between the radially inner edges of the lifting walls and the bottom wall 20A of each side channel back into another of the troughs in the wheel rim lower down the wheel 1.

The chute 19 is at an angle of at least 45° to the horizontal, and preferably at least at 70° to the horizontal, to ensure that the slope of the chute 19 is greater than the expected angle of repose for the material being conveyed. This avoids any tendency for material to stick to the chute. The angle of repose of a particulate material is dependent on the size, shape and moisture content of that material. Generally the smaller the size of the particulate material so the greater its angle of repose and the greater the required inclination of the chute. For particulate material including a mixture of glass cullet dust of particle sizes from 1200 $\mu$m to 45 $\mu$m, the angle of repose and hence the desired inclination of the chute to the horizontal has been found to be at least 70°. The inclination of the lifting walls 12 to the peripheral wall 8 of the channel, that is the angle of the lifting walls 12 to their direction of movement, is geometrically matched to the inclination and disposition of the chute 19 to allow the material carried in the rim of the wheel to be retained by each lifting wall 12 until that lifting wall 12 is above the chute 19.

The side channels 20 are bolted on to the main conveyor structure 22 at their lower ends. In this way the weight of the chute 19 and the side channels 20 is carried by the main conveyor structure 22.

In operation the upper belt run 2 carries material such as raw batch glass-making material or glass cullet dust, in the direction indicated by arrow B in FIG. 2. Some of the material tends to adhere to the conveyor belt and returns along the lower return run 3 of the belt in the direction indicated by arrow C.

The passage of the lower return run 3 over the first lower support roller 5 just after the belt has passed around the end roller of the conveyor causes vibration which results in dislodgement of some of the material adhering to the lower return run 3 of the belt in the vicinity of the support roller 5. The support roller 5 itself also tends to dislodge material off the lower return run 3 of the belt which material falls into the rim channel 11 of the wheel 1.

The dislodged material falls behind the dust guards 15 and 16 into troughs at the base of the wheel 1, and the material is retained in the troughs by the inclined walls 12 of the wheel 1 as the wheel is rotated in the direction A.

The elevator wheel 1 may be driven continuously or intermittently by the driven drum 6 depending on the quantities of material dislodged. If the troughs of the wheel channel 11 are particularly full some of the material held within them may spill out before they are above the chute 19. If this occurs the spilt material falls back into lower parts of the wheel channel 11 down the side channels. The material in the troughs is tipped out into the chute 19 directly onto the upper carrying run 2 of the conveyor belt.

There can be a number of elevator wheels 1 employed at spaced positions along the conveyor where there are support rollers 5.

Figure 3:
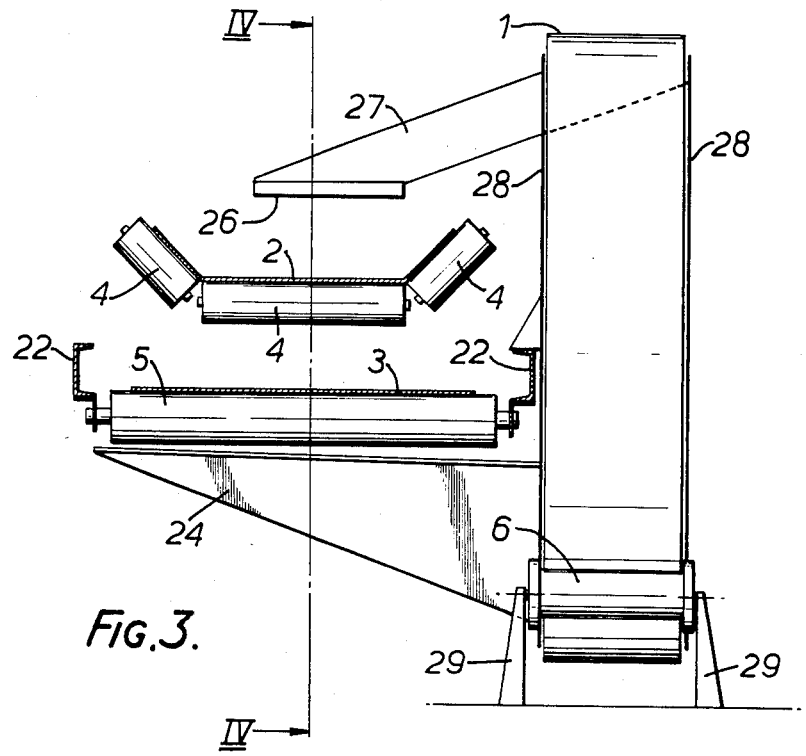
FIG. 3 is a front elevation of another embodiment of the invention.
Figure 4:
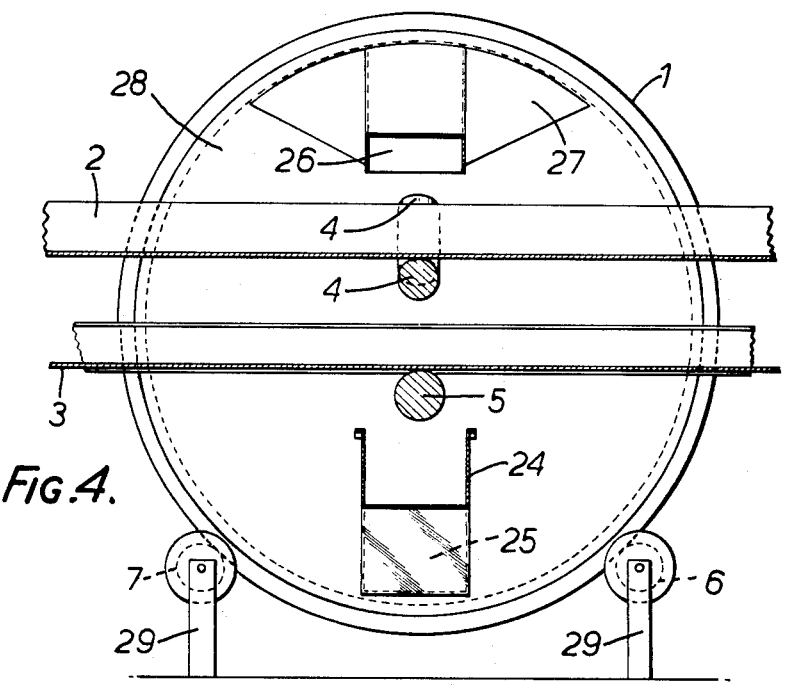
FIG. 4 is a cross-section on line IV—IV of FIG. 3.

In the embodiment illustrated in FIGS. 3 and 4 the elevator wheel 1 is disposed at the side of the conveyor. Detailed features of the apparatus of FIGS. 3 and 4 correspond to identical features in the handling apparatus of FIGS. 1 and 2 and are identified by the same reference numerals.

In order that the elevator wheel 1 may be located at the side of the conveyor it is necessary to mount a feed chute 24 below the support roller 5. The feed chute 24 guides material which becomes dislodged from the return belt run 3 through a feed opening 25 into the troughs at the bottom of the elevator wheel 1 which is rotated in a clockwise direction and lifts the material up to a position where it is discharged through a discharge opening 26 of a chute 27 onto the upper run 2 of the conveyor belt.

In order to reduce any tendency for dust to be blown out of the elevator wheel 1 wind guards 28 cover both open sides of the wheel 1.

The elevator wheel 1 is mounted on upstanding legs 29 fitted with rollers. This makes the elevator wheel 1 portable so that it can be moved up and down the main conveyor to selected sites.

Figure 5:
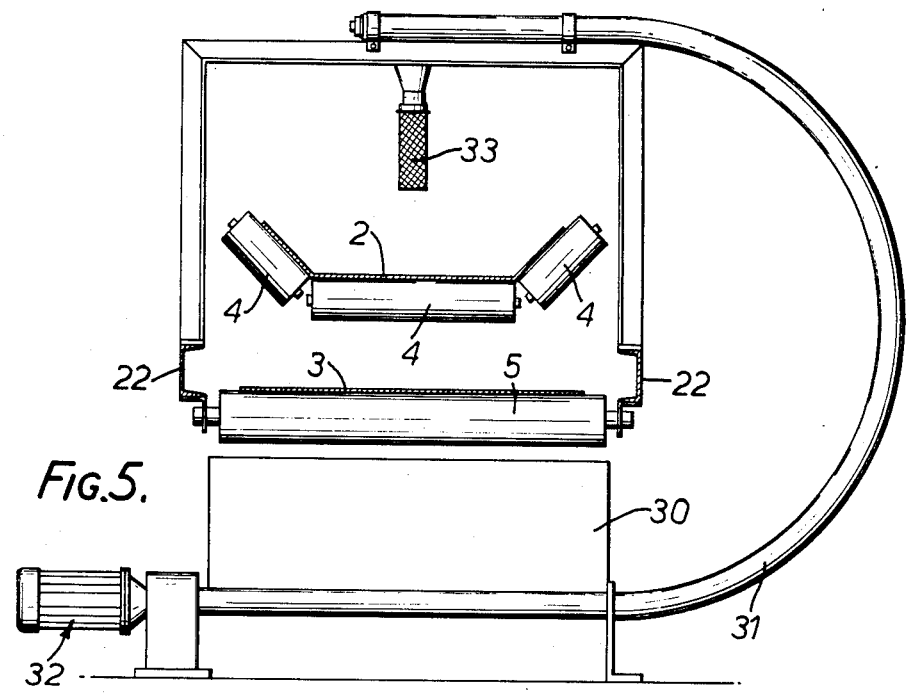
FIG. 5 is a view, partly in section, illustrating another embodiment of the invention.

In the embodiment illustrated in FIG. 5, dislodged material from the lower return run 3 of the belt falls into a feed hopper 30, which has downwardly converging walls. The base of the hopper 30 feeds the material into the lower portion of a flexible screw conveyor 31 driven by a motor and gearing mounted in a housing 32. The flexible screw conveyor 31 feeds the material upwardly to a fabric discharge chute 33 which is disposed directly above the upper carrying run 2 of the belt. The fabric discharge chute 33 serves as a wind guard. The upper portion of the screw conveyor 31 and the fabric discharge chute 33 are carried by the top member of an inverted U-shaped structure supported on the conveyor structure 22.

Figure 6:
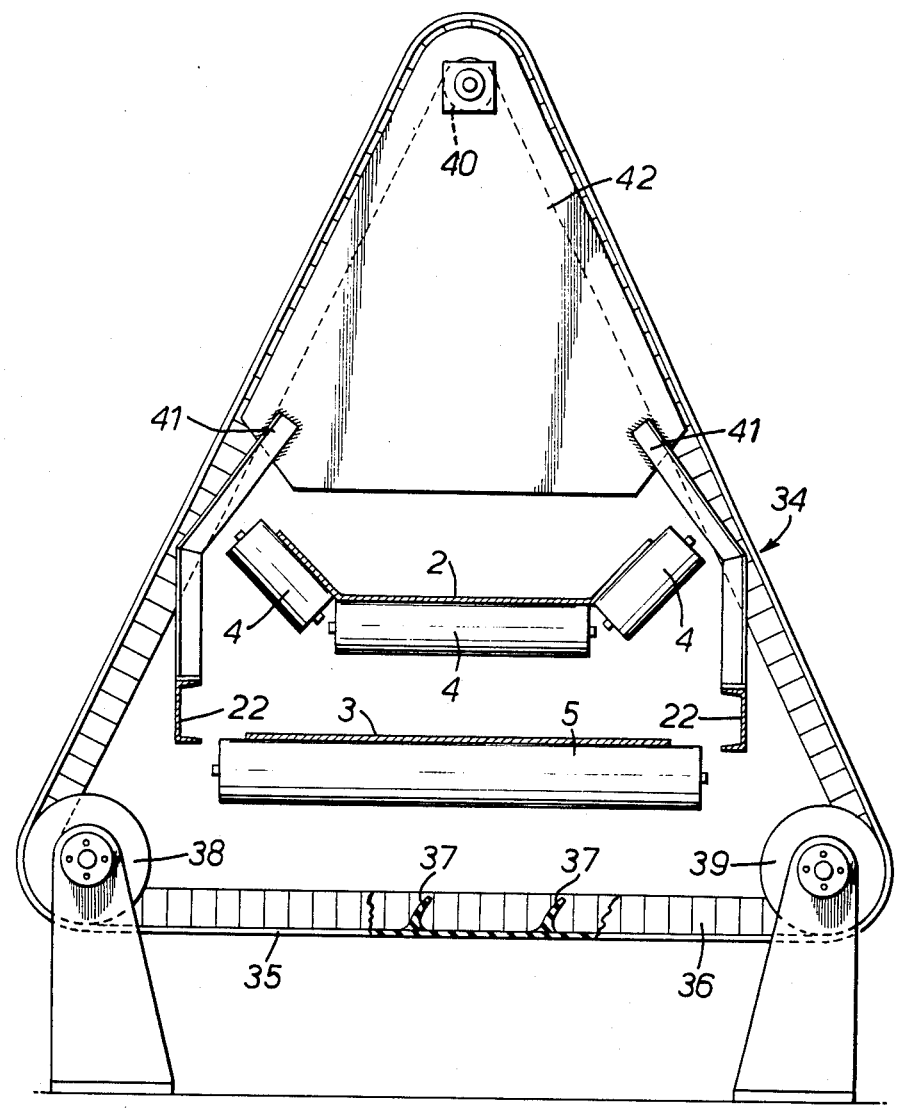
FIG. 6 is an elevation, partly in section, of a further embodiment of the invention.

FIG. 6 illustrates another embodiment of the invention in which a flexible U-section trough elevator 34 is disposed around a section of the belt conveyor. The channel-section of the elevator 34 is formed by a flexible base belt 35 having flexible side walls 36. Rubber lifting blades 37 (only two of which are shown) are fixed at spaced intervals along the length of the channel section. The elevator 34 is driven around two lower pulleys 38 and 39 and over a top supporting drum 40.

In operation material which has fallen into the channel of the elevator between the rubber lifting blades 37 is conveyed by the elevator to a depositing position above the top of a pair of guide walls 41. The material falls down a chute 42 onto the upper carrying run 2 of the belt conveyor.

In the embodiments above the elevators are driven directly from a motor driven drum or pulley. Other forms of drives may be used, for example the elevator can be mechanically driven indirectly from the conveyor belt, and this form of drive is particularly advantageous when there is a need to operate in an environment where electrical discharges must be avoided, such as in a coal mine. The mechanical linkages in an indirect drive arrangement may include a belt and pulley arrangement, or a gearbox and a solid drive shaft, or a gearbox and a flexible shaft (like a speedometer cable) connecting one of the support rollers of the conveyor to the drum driving the elevator.

Figure 7:
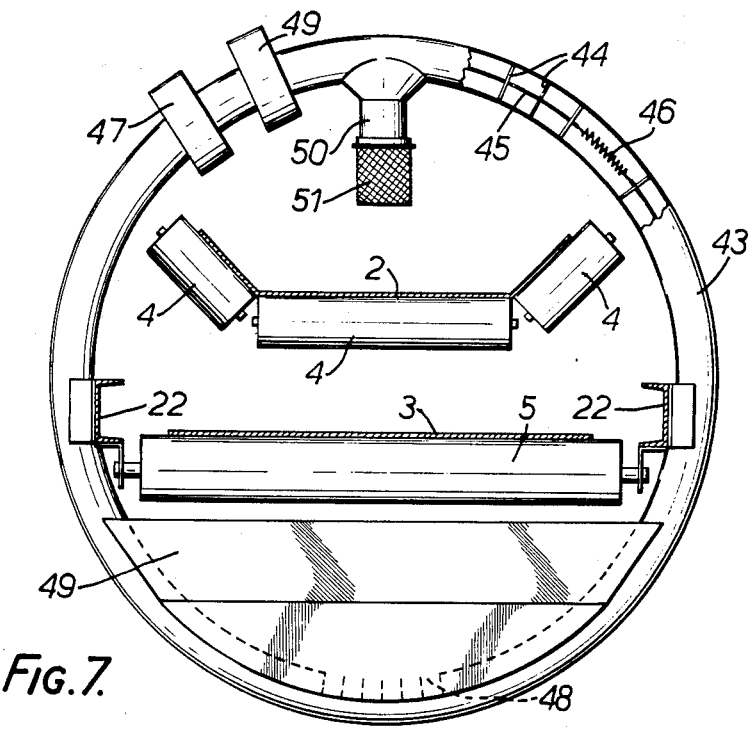
FIG. 7 is an elevation, partly in section, of a further embodiment of the invention.

A further embodiment is shown in FIG. 7 in which an electro-magnetic pulse drive is employed. In FIG. 7 an elevator 43 is in the form of a fixed non-metallic tube formed into a ring surrounding the belt conveyor. The inside of the tube is segmented into a number of compartments defined between pairs of spaced steel scraper discs 44 which are slidably mounted within the tube. The discs 44 are joined together by means of a non-metallic rope 45 and the rope 45 and discs 44 are held under tension by means of a spring 46. A pair of electro-magnetic pulse coils 47 are provided which are pulsed in turn to urge the metallic scraper discs around the tube. The tube has an opening 48 at its lower part through which material falls into the compartments within the tube. To reduce escape of dust as the material falls from the lower return run 3 of the belt conveyor two wind guards 49 are provided, one on each side of the ring. A discharge chute 50 depending from a discharge port in the top of the tube is disposed above the carrying run 2 of the belt conveyor and is provided with a fabric wind guard 51.

In all the embodiments of the invention described herein, by way of example, there is no contact between the elevator and the underside of the return run of the belt. This eliminates the considerable wear and tear on the belt that would otherwise occur.

The embodiments of FIGS. 1 and 2, FIGS. 3 and 4 and FIG. 6 have the additional advantage that the elevator as a whole moves around or adjacent to the belt conveyor thus eliminating possible wear and tear and frictional forces due to scraping of members against channel walls of the elevator.

I claim:

1. Apparatus for collecting material which becomes dislodged from the underside of the return run of a continuous belt conveyor having an upper carrying run and a lower return run, which apparatus comprises:

an elevator for surrounding a section of the conveyor in the region of a support roller for the return run of the conveyor, which elevator has a channel section in which material dislodged by the influence of the support roller during the return run of the conveyor can be collected and transported to a depositing position above the carrying run of the conveyor;

a chute at the depositing position to guide material onto the carrying run;

wherein the channel section of the elevator is formed of a circumferential base wall and side walls extending radially inwardly therefrom and is divided into troughs by lifting walls extending transversely across the channels at discrete spaced locations therealong, which lifting walls are inclined to the base wall of the channel, and the inclination of the lifting walls is geometrically matched to the inclination and disposition of the chute so that the bulk of the material in each trough is retained until its lifting wall is above the chute, and returning means for returning material dislodged from the troughs during their upward journey to said chute, said returning means comprising material-return channels depending downwardly from opposite sides of said chute, each said material-return channel including a bottom wall and side walls which overlap outer surfaces of said side walls of said elevator, said bottom wall spaced radially inwardly from radially inner ends of said lifting walls and said side walls of said elevator to define a gap between said bottom wall of said material-return channel and said lifting walls of said elevator through which material may fall and be guided to a lower trough by said bottom wall.

2. Apparatus as claimed in claim 1, wherein the angle of inclination of the chute to the horizontal is at least equal to the angle of repose of material which is to be fed down the chute.

3. Apparatus as claimed in claim 2, wherein the chute is inclined to the horizontal at an angle of at least 45° and preferably more than 70°.

4. Apparatus as claimed in claim 1, wherein the elevator is in the form of a wheel.

5. Apparatus as claimed in claim 4, wherein the wheel is motor driven.

* * * * *